United States Patent [19]

Parker

[11] 3,953,971
[45] May 4, 1976

[54] POWER GENERATION ARRANGEMENT
[76] Inventor: Sidney A. Parker, 5820 Diamond Oaks Drive South, Fort Worth, Tex. 76117
[22] Filed: Jan. 2, 1975
[21] Appl. No.: 538,011

[52] U.S. Cl. ................................. 60/641; 60/398; 60/651; 60/671; 60/675; 62/119; 62/260; 165/45
[51] Int. Cl.² ......................................... F03G 7/04
[58] Field of Search ................ 165/45; 60/692, 641, 60/690, 651, 671, 675, 398; 62/260, 119

[56] References Cited
UNITED STATES PATENTS

| 196,759 | 11/1877 | Miller | 60/675 |
| 1,493,368 | 5/1924 | Merz | 60/641 |

FOREIGN PATENTS OR APPLICATIONS

| 1,200,440 | 12/1959 | France | |

Primary Examiner—Allen M. Ostrager
Attorney, Agent, or Firm—Seymour Rothstein

[57] ABSTRACT

This invention relates to a system for generating power utilizing the elevation differences and available temperatures on the earth's surface, such as occurs in a mountainous region with a nearby valley or desert. The system includes heat rejection means, as for example, a condenser located at a higher elevation (a mountain top). Means for supplying heat to the system may be provided at a lower elevation (in a valley or desert region below). A geothermal source of heat, such as a hot spring, may be used. Power generation means are also provided in the valley and operatively communicated with the condenser on the mountain top and the heat supply means in the valley. Liquid flowing from the condenser to the power generation means at a relatively high pressure will drive the power generation means to create electrical energy and the liquid will be expanded, vaporized and cooled. The cooled vapor will absorb heat from the heat supply means and then be returned to the condenser on the mountain top. It may be desirable to have the relatively high pressure liquid pass through the power generation means in a liquid stage. The liquid will then be boiled off into a vapor at the heat supply means. This vapor then will be returned to the condenser on the mountain top.

In some instances it may be desirable to add heat or work to the vapor in order to assist the return of same to the mountain top.

Another aspect of this invention is to take advantage of a source of cold at the relatively cool mountain top and a source of warmth in the relatively hot valley or desert. Additional power may be derived with a compound cycle where there is heat exchange between the ambient or other sources of cold and warmth at the mountain top and in the valley or desert below.

41 Claims, 3 Drawing Figures

POWER GENERATION ARRANGEMENT

BACKGROUND AND SUMMARY OF THE INVENTION

This invention relates to a system for generating power utilizing the elevation differences and available temperatures on the earth's surface.

For some time, concern has been expressed regarding the availability of natural resources to provide the increasing power demands of the inhabitants of the earth. The recent oil crises brought into focus the increasing demands for power in our country and elsewhere. In considering the various means for generating power, it occurred to me that better use could be made of the earth's topography and that an efficient power generating system could be provided that utilized the elevation differences on the earth's surface and the available temperatures on the earth's surface. A number of regions in our country and elsewhere around the world have relatively high mountains which are relatively cool at the top and relatively low valleys nearby which are relatively warm. These regions have tremendous potential energy that can be tapped to provide electrical power in large amounts.

An object of the present invention is to provide novel means for generating power utilizing the elevational differences and available temperatures on the earth's surface.

Another object of the present invention is to provide an improved system for generating power that includes heat rejection means disposed at a relatively cool high place on the earth's surface, a heat supply means disposed at a relatively warm lower level on the earth's surface, power generation means at the lower level, a relatively small diameter conduit communicating the heat rejection means with the power generation means, and a relatively large diameter insulated conduit communicating the heat rejection means, whereby liquid flowing through the small diameter conduit will actuate the power generation means and either be emitted as a liquid or be flashed into vapor, with heat being added at the heat supply means to assist in returning the vapor to the heat rejection means.

Yet another object of the invention is to provide an improved system for generating power that includes a compound cycle. The compound cycle has a heat exchanger either before or after the power generation means, depending on the system, and a second heat exchanger independent of the heat supply means, with a second power generation means situated between the two heat exchangers, and a relatively large vapor line connecting the two heat exchangers.

Other objects and advantages of the present invention will be made more apparent hereinafter.

BRIEF DESCRIPTION OF THE DRAWINGS

There is illustrated in the attached drawing presently preferred embodiments of the present invention, wherein:

FIG. 3 shows yet another modification of FIG. 1 where a compound cycle has been added for more efficient use of the available energy.

DETAILED DESCRIPTION OF THE PREFERRED EMBODIMENT

Figure 1:
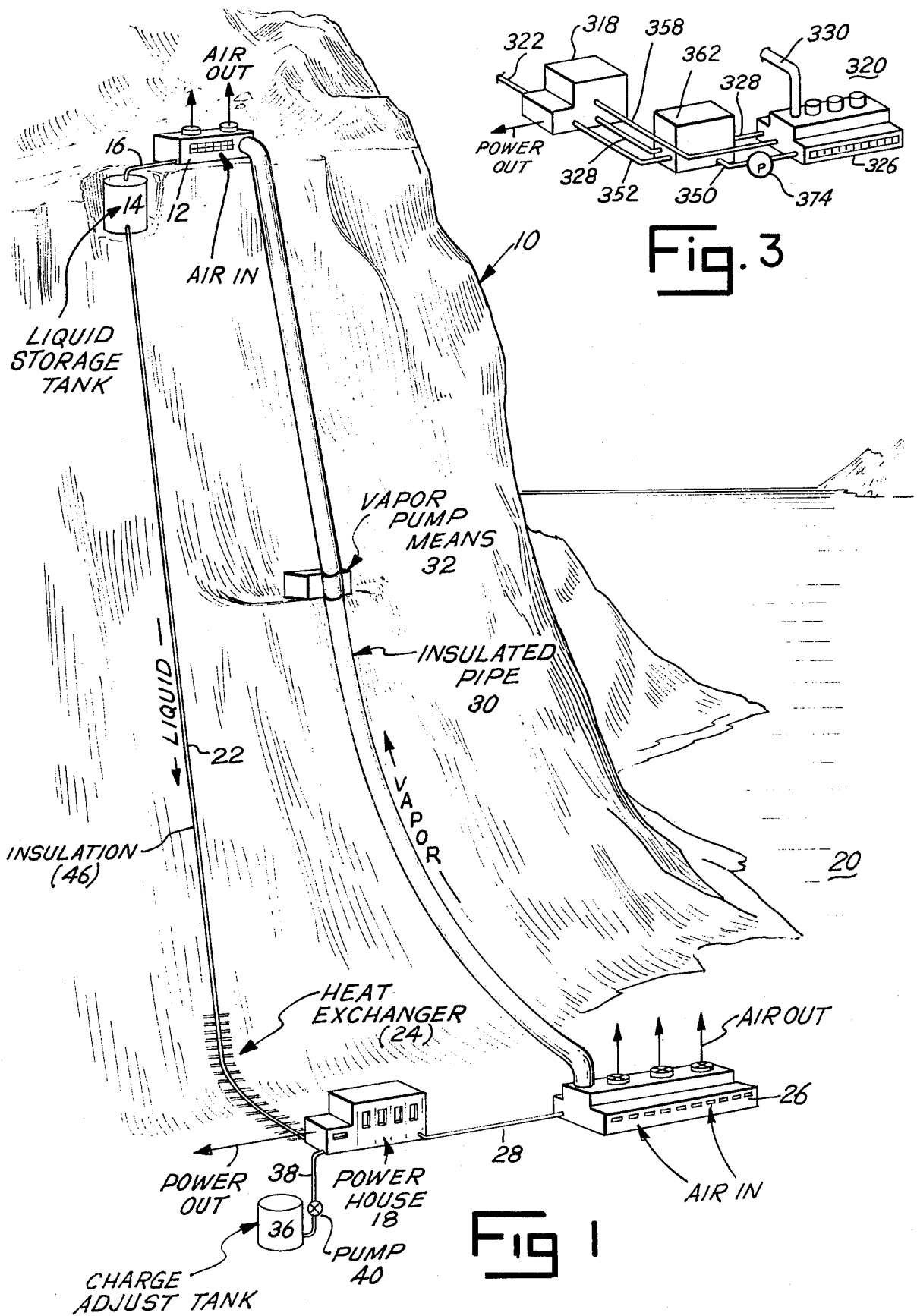
FIG. 1 is a perspective view of one form of the present system illustrating the essential components thereof and the relationship between the components on the earth's surface.

Referring now to FIG. 1, there is illustrated a power generation system embodying principles of the present invention. The present system is adapted to be utilized on the earth's surface in an area where there are relatively large elevation differences between the proximate points on the earth's surface, as for example, a mountain top and the valley below. It is known, for example, from the *Ashrae Guide 1963*, page 39, that the definition of a standard atmosphere is $T - T_0 - 0.003566 Z$, where $T$ is temperature in degress Fahrenheit at an elevation $Z$. $T_0$ is temperature in degress Fahrenheit at sea level and $Z$ is elevation in feet. The practical limit for this relationship is 35,332 feet. Relating this equation to temperatures at different elevations, the relationship is expressed as $T_2 = T_1 - 0.003566 (Z_2 - Z_1)$ where $T_1$ is a temperature in degrees Fahrenheit at a lower elevation, as for example, at sea level; and $Z_1$ is the lower elevation in feet. $T_2$ is the temperature at the upper elevation in degrees Fahrenheit and $Z_2$ is the elevation at the upper level in feet.

One area with large available heat and elevation differences would be Peru and Chile in South America where the Andes Mountains are on the order of 20,000 feet high, thus providing a substantial elevation difference. Here, there are relatively cool temperatures in the mountains and relatively warm temperatures in the valleys or Pacific Ocean below. Many areas within the United States would similarly be suitable, as for example, the Death Valley region. Death Valley is below sea level and reaches temperatures in the daytime on the order of 135°F. Not far away is Telescope Peak, which is 11,045 feet high. The elevation difference between the valley and the mountain top is in excess of 11,300 feet. Regions such as this provide the necessary temperatures and elevational differences required for efficient operation of my improved power generation system.

Referring to FIG. 1, the mountain 10 is provided at a location proximate the top thereof with a heat exchanger or condenser 12, which is preferably of the air cooled type, so as to take advantage of the natural air currents available. It is within the scope of this invention to utilize a water-cooled condenser. A liquid storage tank 14 is provided on the mountain top in close proximity to the condenser 12 and is communicated to the condenser 12 by a relatively short and small diameter conduit 16.

A power house 18 is provided in the valley 20. Preferably, there is a maximum elevation difference between the power house 18 and the condenser 12. A conduit 22 of relatively small diameter connects the liquid storage tank 14 with the power house 18. Heat exchanger 24 may be provided in the conduit 22 adjacent or in relatively close proximity to the power house 18 in order to supply heat to the liquid entering the power house, if desired. Liquid line 22 may or may not be insulated.

Liquid entering the power house 18 will drive power generating means, for example, a turbine, and the liquid will be emitted as a liquid or be cooled and vaporized. Such vapor or liquid will flow through conduit 28 to heat exchanger 26, provided in the valley 20, at as low an elevation as possible relative to the mountain top. Heat exchanger 26 will draw relatively warm air from the valley 20 and thereby heat the fluid received from the power house 18 via the conduit 28. The heat exchanger may be air cooled, as shown. Alternatively, heat exchanger 26 may be connected to a geothermal source, for example, a hot spring, in order to draw heat from within the earth or from a large body of water such as a lake or ocean. Vapor is returned from the heat exchanger 26 to the condenser 12 through the relatively large diameter insulated pipe 30. Vapor pump means 32 may be provided at a point intermediate the heat exchanger 26 and the condenser 12 to assist return of the vaporous fluid from the heat exchanger 26 to the condenser 12.

A charge adjustment tank 36 may be provided in the valley 20, and operatively connected to the power house 18 by means of a conduit 38. Pump 40 is provided in the conduit 38 in order to control the flow of fluid from the charge adjust tank to the system and vice versa. The charge adjustment tank 36, conduit 38 and pump 40 provide charge adjustment means for the system.

Turning now to a consideration of the operation of the system, it is noted that different types of fluid may be utilized. The fluid will have a vapor form at one temperature and pressure and a liquid form at another temperature and pressure.

Assuming that the fluid is water and that there is an elevation difference between the mountain top and the valley below of 11,326 feet (as there would be between the bottom of Death Valley and the top of Telescope Peak) for every 2.3 feet of elevation in a water column there would be 1 pound per square inch of pressure. Therefore, 11,326 feet divided by 2.3 equals 4,924 pounds per square inch of pressure at the bottom of conduit 22 connecting the liquid storage tank 14 with the power house 18.

Within the power house 18, is provided a positive displacement or impulse type device, as for example, a rotary vane or rotary screw or turbine. The water in liquid form, passing through the relatively small diameter conduit 22, passes through the drive means which drives the generator to provide power out from the power house. The liquid from the drive means in the power house 18 will pass through the conduit 28 and be flashed into vapor in heat exchanger 26. The vapor will return to the condenser 12 through the relatively large diameter insulated pipe or conduit 30. The atmosphere at the mountain top, which is relatively cool, will cool and condense the vapor into water droplets which will pass into the liquid storage tank 14.

The pipe 30 is insulated so as to prevent water vapor from condensing into water droplets and falling back down into the heat exchanger 26 in valley 20 and adversely affecting operation of the system.

In one form of the invention, the pipe 22 will be on the order of 6 inches inside diameter and the pipe 30 will be on the order of 6 to 8 feet inside diameter.

Considering the operation further, it is noted that there was 4,924 pounds per square inch of pressure to drive the drive means in the power house 18.

The power available can be determined by the flow rate per unit of time and the pressure available to the drive means. With a hundred gallons per second flowing through the drive means, there would be almost 13 megawatts (12,815,814 watts) or 17,186.7 horse power or 43,739,979 BTU/HR. If the flow rate were 1 cubic foot per second, there would be 3,268,656 BTU/HR or 957,716 watts or 1,285 horse power. It is seen from these figures that substantial amounts of energy will result from operation of the system of the present invention.

Though the cycle of operation has been described utilizing water as the liquid, it is apparent that water in a sense operates as a refrigerant and that other refrigerants may be utilized in place of water, as for example, R–113, butane, propane, or carbon dioxide.

Sample calculations for the amount of available power considering Pikes Peak are very impressive in terms of power potential. Pikes Peak is 14,110 feet high and the foot of the mountain is at an elevation of 5,000 feet. Thus, there is a differential height of 9,110 feet. An average temperature differential on the order of 32.5°F exists. Dividing the height differential by 2.3 feet results in 3,961 pounds per square inch of pressure at the 5,000 foot elevation.

The power generated if 1 cubic foot of water per second passes through the power house is 9,110 feet time 1 cubic foot of water per second times 0.113 equals 1,029 horse power or 767,974 watts or 2,618,792 t. u. per hour. This calculation is based on a flow rate of 1 cubic foot per second of water and would be increased in direct proportion to the increase in flow rate.

If the fluid utilized in the system is water, then depending on the height differential there would ordinarily be sufficient heat picked up by the heat exchanger 26 to return the vapor to the condenser 12. However, if insufficient flow is encountered, vapor boost means or vapor pump means may be employed. Should the fluid be a refrigerant, as for example, a fluorinated hydrocarbon, e.g., R–113, then the vapor will need an assist in order to return to the condenser 12 and in such event, the vapor pump means 32 would be operative. Other refrigerants that could be used include butane, propane, methyl chloride.

It is sometimes necessary to adjust the charge to the system to accommodate changes in seasons, as well as the wide temperature fluctuations of a hot warm day and a cool night. This may be accomplished by means of the charge adjust tank 36 and pump 40 which communicate with the system in the power house 18. The charge adjustment means comprising tank 36, conduit 38 and pump 40 will adjust the charge in the system to optimize operation depending upon heat radiation as occurs through daily, seasonal and/or geothermal change.

Figure 2:
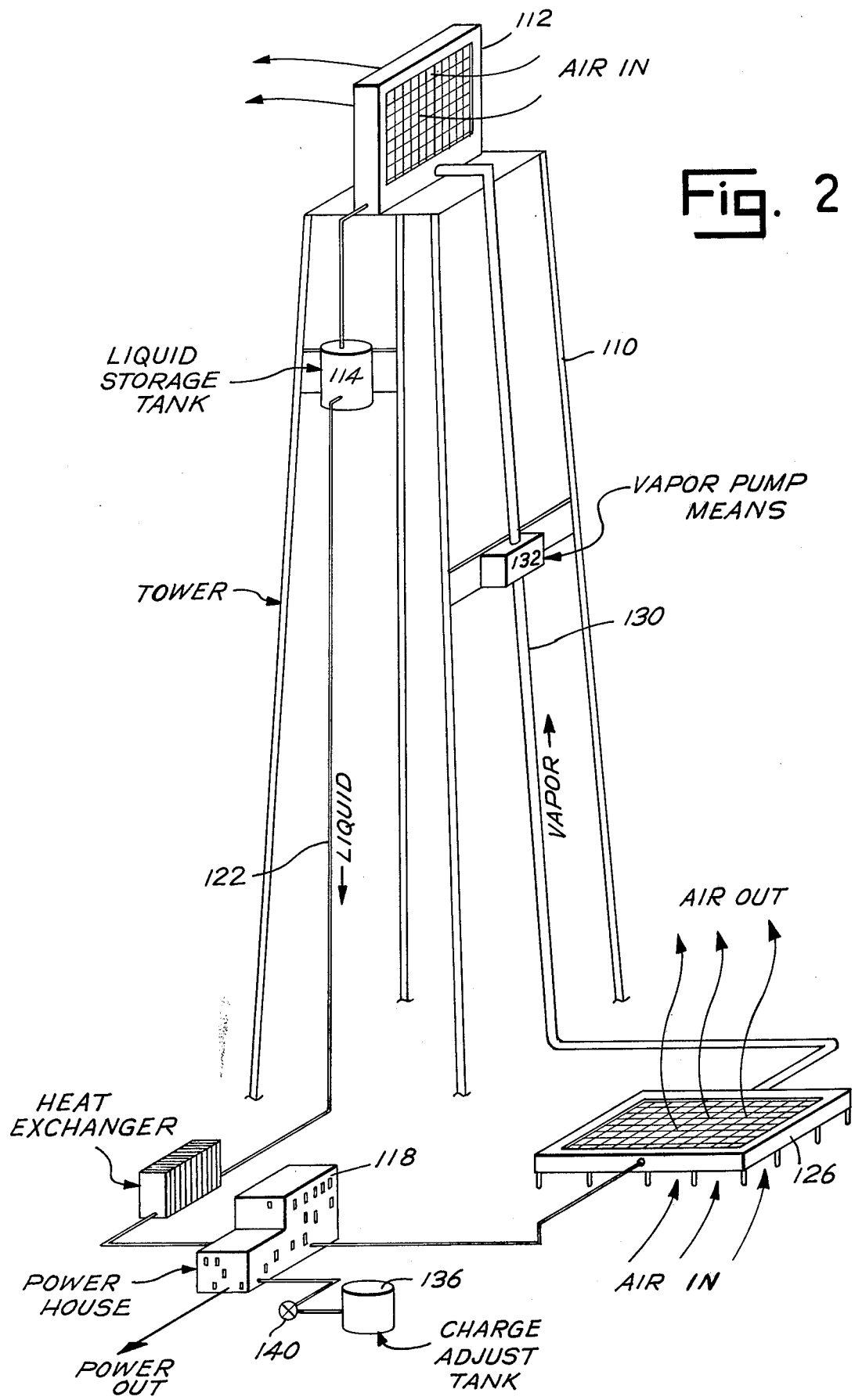
FIG. 2 illustrates a modification of the system of FIG. 1.

Turning now to FIG. 2, there is illustrated schematically a man-made arrangement similar to the natural arrangement of FIG. 1. The heat exchanger 112 is at an upper elevation on top of frame 110, and the heat exchanger 126 is at a lower elevation on the ground below. The heat exchanger may rely on natural convection, or ancillary fan means may be used in order to provide for air movement over the heat exchangers. If desired, a water cooled condenser could be used in place of an air cooled condenser. Heat exchanger 126 may be a grid of pipes laid on dry desert land and black asphalt laid over and in thermal contact with pipes.

The heat exchanger 26 (FIG. 1) or 126 (FIG. 2) operates as an evaporator, that is, it would remove or absorb heat from the surrounding ambient and thus, may be thought of as a boiler. In basic respects, the system shown in FIG. 2 operates in the same manner as the system shown in FIG. 1, and accordingly, like parts in FIG. 2 have been designated by the same numerals as in FIG. 1, plus the prefix 1.

Referring now to FIG. 3, a compound cycle can be added to either FIG. 1 or FIG. 2. FIG. 3 illustrates a refinement of either FIG. 1 or FIG. 2 where additional energy can be generated by taking advantage of the temperature difference of the relatively cold liquid in pipe 328 and the relatively warm valley 320. Pipes 322 and 328 are insulated by suitable insulation to maintain maximum energy potential. Heat exchanger 362 is in heat exchange relationship to the liquid within pipe 328. Condensed liquid in pipe 350 is pumped by feed pump 374 to the heat exchanger (not shown) in building 326 and is expanded into relatively high pressure gas. It is then sent to power house 318 through pipe 358 where energy is extracted from the relatively high pressure gas, wherein the gas temperature is somewhat reduced. The somewhat rarefied (expanded) gas is sent through pipe 352 and is further cooled and condensed in heat exchanger 362. The condensed liquid exits heat exchanger 362 through pipe 350 and again the liquid is elevated in pressure by the feed pump 374 in pipe 350 where the cycle starts over.

There has been provided by the present invention an improved system for generating power utilizing the elevation differences and available temperatures on the earth's surface. As evidenced from the calculations presented above, tremendous energy potential is available utilizing applicant's system, with relatively little power input required and hence, little use of fossil fuels. It is seen that the heat exchanger at the lower level in the applicant's system effectively utilizes the available heat from the valley or the heat from a geothermal source. It is contemplated that solar heat could be used in combination with the heat from the valley or lower level.

The potential of the applicant's power generation arrangement is very broad in terms of energy output versus fossil fuel (or like fuel) input. Among regions in the United States having desirable elevation and temperature differentials are Mt. Shasta, Mt. McKinley, and Mt. Rainier.

While there has been disclosed presently preferred embodiments of the invention, it will be understood that the invention is not limited thereto since it may be otherwise embodied within the scope of the following claims.

I claim:

1. A system for generating power utilizing the elevation difference between a higher elevation and a lower elevation and available temperatures of the earth's surface comprising heat rejection means at a higher elevation, heat supply means at a lower elevation, power generation means at substantially the same level as the heat supply means between the heat rejection means and the heat supply means, relatively small diameter conduit means communicating the heat rejection means and the power generation means and the heat supply means respectively, and relatively large diameter insulated conduit means communicating the heat supply means with the heat rejection means, whereby fluid flowing through the relatively small diameter conduit means will actuate the power generation means and be cooled, and the cooled fluid will absorb heat from the heat supply means and flow to the heat rejection means.

2. A system as in claim 1 including a liquid storage tank for storing liquid at said higher elevation.

3. A system as in claim 1 including vapor pump means in the relatively large diameter conduit means.

4. A system as in claim 1 wherein the relatively small diameter conduit means is thermally insulated.

5. A system as in claim 1 including a heat exchanger in association with the small diameter conduit means for adding heat to the liquid in said small diameter conduit means.

6. A system as in claim 1 including charge adjust means for adjusting the quantity of fluid in the system for optimum operation depending upon heat radiation as occurs through daily, seasonal and/or geothermal changes.

7. A system as in claim 2 including vapor pump boost means in the relatively large diameter conduit means.

8. A system as in claim 2 wherein the relatively small diameter conduit means is thermally insulated.

9. A system as in claim 2 wherein a heat exchanger is disposed in the relatively small diameter conduit means.

10. A system as in claim 2 including charge adjustment means.

11. A system as in claim 3 wherein the relatively small diameter conduit means is thermally insulated.

12. A system as in claim 3 including a heat exchanger in the relatively small diameter conduit means.

13. A system as in claim 3 including charge adjustment means.

14. A system as in claim 4 including a heat exchanger in the relatively small diameter conduit means.

15. A system as in claim 4 including a charge adjustment means.

16. A system as in claim 7 wherein the relatively small diameter conduit means is thermally insulated.

17. A system as in claim 7 including a heat exchanger in the relatively small diameter conduit means.

18. A system as in claim 7 including charge adjust tank means.

19. A system as in claim 1 including compound power generation means comprising secondary power generation means and a secondary heat source at the lower elevation, wherein power is derived from the temperature difference between the relatively low temperature fluid leaving the primary power generation drive means and the relatively warm temperature fluid leaving said heat source at the lower elevation.

20. A system as in claim 2 including compound power generation means comprising secondary power generation means and a secondary heat source in the lower elevation, where power is derived from the temperature difference between the relatively low temperature fluid leaving the primary power generation drive means and the relatively warm temperature fluid leaving said heat source at the lower elevation.

21. A system as in claim 3 including compound power generation means comprising secondary power generation means and a secondary heat source at the lower elevation, wherein power is derived from the temperature difference between the relatively low temperature fluid leaving the primary power generation drive means and the relatively warm temperature fluid leaving said heat source at the lower elevation.

22. A system as in claim 4 including compound power generation means comprising secondary power generation means and a secondary heat source at the lower elevation, where power is derived from the temperature difference between the relatively low temperature fluid leaving the primary power generation drive means and the relatively warm temperature fluid leaving said heat source at the lower elevation.

23. A system as in claim 6 including compound power generation cycle means comprising secondary power generation means and a secondary heat source at the lower elevation, wherein power is derived from the temperature difference between the relatively low temperature fluid leaving the primary power generation drive means and the relatively warm temperature fluid leaving said heat source at the lower elevation.

24. A system as in claim 7 including a compound power generation means comprising secondary power generation means and a secondary heat source at the lower elevation, wherein power is derived from the temperature difference between the relatively low temperature fluid leaving the primary power generation drive means and the relatively warm temperature fluid leaving said heat source.

25. A system as in claim 8 including a compound power generation means comprising secondary power generation means and secondary heat source at the lower elevation, wherein power is derived from the temperature difference between the relatively low temperature fluid leaving the primary power generation drive means and the relatively warm temperature fluid leaving said heat source.

26. A system as in claim 10 including a compound power generation means comprising secondary power generation means and a secondary heat source at the lower elevation, wherein power is derived from the temperature difference between the relatively low temperature fluid leaving the primary power generation drive means and the relatively warm temperature fluid leaving said heat source.

27. A system as in claim 11 including a compound power generation means comprising secondary power generation means and secondary heat source at the lower elevation wherein power is derived from the temperature difference between the relatively low temperature fluid leaving the primary power generation drive means and the relatively warm temperature fluid leaving said heat source.

28. A system as in claim 15 including a compound power generation means comprising secondary power generation means and a secondary heat source at the lower elevation, wherein power is derived from the temperature difference between the relatively low temperature fluid leaving the primary power generation drive means and the relatively warm temperature fluid leaving said heat source.

29. A system as in claim 16 including a compound power generation means comprising secondary power generation means and a secondary heat source at the lower elevation, wherein power is derived from the temperature difference between the relatively low temperature fluid leaving the primary power generation drive means and the relatively warm temperature fluid leaving said heat source.

30. A system as in claim 18 including a compound power generation means comprising secondary power generation means and a secondary heat source at the lower elevation, wherein power is derived from the temperature difference between the relatively low temperature fluid leaving the primary power generation drive means and the relatively warm temperature fluid leaving said heat source.

31. A system as in claim 1 wherein the heat supply means is a geothermal source.

32. A system as in claim 31 wherein the heat supply means comprises solar heat in combination with that from a geothermal source.

33. A system as in claim 1 wherein the heat rejection means comprises a condenser utilizing natural convection.

34. A system as in claim 1 wherein the heat rejection means comprises a condenser that includes fan means for moving the air over the condenser.

35. A system as in claim 6 wherein the charge adjust means includes a reservoir and a pump responsive to predetermined conditions to move fluid from the system to the reservoir or from the reservoir to the system.

36. A system as in claim 1 wherein the fluid is a refrigerant.

37. A system as in claim 1 wherein the fluid has a vapor form at one temperature-pressure and a liquid form at a lower temperature-pressure.

38. A system as in claim 1 wherein the fluid is water.

39. A system as in claim 1 wherein the fluid is a refrigerant taken from the group comprising a fluorinated refrigerant compound, butane, propane, methylchloride or carbon dioxide.

40. A system as in claim 1 wherein the fluid is a refrigerant taken from the group comprising naptha, ammonia, methyl chloride sulphur dioxide or ethane.

41. A method of generating power by a system utilizing the elevation difference between a higher elevation and a lower elevation and available temperatures of the earth's surface, comprising the steps of rejecting heat from the system at a higher elevation, supplying heat to the system at a lower elevation, passing liquid from the higher elevation to the lower elevation through relatively small diameter conduit means, driving power generation means disposed at substantially the same level as the heat supply means by the potential heat of liquid flowing through the system from the higher elevation to the lower elevation, said liquid actuating the power generation means and being vaporized and cooled and the vaporized and cooled fluid absorbing heat at the lower elevation, and returning vapor from the lower elevation to the higher elevation through relatively large diameter insulated conduit means.

* * * * *